United States Patent
Wei

(10) Patent No.: US 9,860,675 B2
(45) Date of Patent: Jan. 2, 2018

(54) METHOD OF PROVIDING INFORMATION ON DEVICE-TO-DEVICE RESOURCES, CELLULAR NETWORK NODE AND USER EQUIPMENT

(71) Applicant: Sony Corporation, Tokyo (JP)

(72) Inventor: Na Wei, Beijing (CN)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/559,490

(22) Filed: Dec. 3, 2014

(65) Prior Publication Data

US 2016/0021483 A1  Jan. 21, 2016

Related U.S. Application Data

(63) Continuation-in-part of application No. PCT/CN2014/082479, filed on Jul. 18, 2014.

(51) Int. Cl.
*H04W 4/02*  (2009.01)
*H04W 4/00*  (2009.01)

(52) U.S. Cl.
CPC ........... *H04W 4/005* (2013.01); *H04W 4/023* (2013.01)

(58) Field of Classification Search
CPC ..... H04W 40/00; H04W 4/025; H04W 4/028; H04W 84/18; H04W 88/04
See application file for complete search history.

(56) References Cited

U.S. PATENT DOCUMENTS

| | | | | |
|---|---|---|---|---|
| 2011/0258327 A1* | 10/2011 | Phan | ............... | H04W 76/023 709/227 |
| 2012/0106517 A1* | 5/2012 | Charbit | ............ | H04W 72/04 370/336 |
| 2013/0083779 A1* | 4/2013 | Ahn | .................. | H04W 72/04 370/336 |
| 2013/0157656 A1* | 6/2013 | Gao | ................. | H04W 76/023 455/434 |
| 2013/0157676 A1* | 6/2013 | Baek | ............... | H04W 76/023 455/452.1 |
| 2014/0128089 A1* | 5/2014 | Jang | ................ | H04W 72/082 455/452.2 |

(Continued)

FOREIGN PATENT DOCUMENTS

| | | |
|---|---|---|
| WO | 2014018333 A2 | 1/2014 |
| WO | 2014070058 A1 | 5/2014 |

OTHER PUBLICATIONS

3GPP TS 25.331 V12.2.0 (Jun. 2014). "3rd Generation Partnership Project; Technical Specification Group Radio Access Network; Radio Resource Control (RRC); Protocol specification (Release 12)".

(Continued)

*Primary Examiner* — David Bilodeau
(74) *Attorney, Agent, or Firm* — Renner, Otto, Boisselle & Sklar, LLP

(57) ABSTRACT

To provide information on resources for a device-to-device discovery and/or a device-to-device communication, a comparison of device-to-device resources for a cell and further device-to-device resources for at least one further cell different from the cell is performed. At least one information element of a message for transmission to a user equipment is generated based on a result of the comparison.

23 Claims, 8 Drawing Sheets

(56) References Cited

U.S. PATENT DOCUMENTS

| | | | |
|---|---|---|---|
| 2014/0162668 A1 | 6/2014 | Na et al. | |
| 2014/0162688 A1* | 6/2014 | Edge | H04W 8/005 455/456.1 |
| 2014/0206322 A1* | 7/2014 | Dimou | H04W 4/005 455/414.1 |
| 2015/0056982 A1* | 2/2015 | Sorrentino | H04W 60/00 455/426.1 |
| 2015/0215767 A1* | 7/2015 | Siomina | H04W 8/02 455/435.2 |

OTHER PUBLICATIONS

3GPP TS 36.331 V11.5.0 (Sep. 2013). "3rd Generation Partnership Project; Technical Specification Group Radio Access Network; Evolved Universal Terrestrial Radio Access (E-UTRA); Radio Resource Control (RRC); Protocol specification (Release 11)".

3GPP TR 22.803 V12.1.0 (Mar. 2013). "Feasibility study for Proximity Services (ProSe)".

3GPP TR 22.803 V12.2.0 (Jun. 2013). "Feasibility study for Proximity Services (ProSe)".

3GPP TR 36.843 V.12.0.1 (Mar. 2014). "Study on LTE device to device proximity services; Radio aspects".

3GPP TSG RAN Meeting #58. RP-122009. Qualcomm Incorporated. "Study on LTE Device to Device Proximity Services".

3GPP TSG RAN Meeting #63. RP-140518. Qualcomm Incorporated. "Work item proposal on LTE Device to Device Proximity Services".

3GPP TSG-RAN Working Group 2 meeting #87. R2-143071. Dresden, Germany, Aug. 18-Aug. 22, 2014. "Report of 3GPP TSG RAN WG2 meeting #86".

3GPP TSG-SA WG1 Meeting #66. S1-141389. Qualcomm Incorporated. "Review of ProSe stage-1 fulfilment (TS 22.278)".

International Search Report and Written Opinion for corresponding International Application PCT/CN2014/082479, mailed on Apr. 21, 2015.

* cited by examiner

METHOD OF PROVIDING INFORMATION ON DEVICE-TO-DEVICE RESOURCES, CELLULAR NETWORK NODE AND USER EQUIPMENT

Method of providing information on device-to-device resources, cellular network node and user equipment

FIELD OF THE INVENTION

Embodiments of the invention relate to mobile communication systems. Embodiments of the invention relate in particular to techniques for providing information on resources for device-to-device discovery and/or device-to-device communication in mobile communication networks.

BACKGROUND OF THE INVENTION

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. For illustration, if a user equipment indicates an emergency call situation, another user equipment may provide repeater function to ensure good network coverage for the user equipment. Direct data or voice communication between user equipments is another example for use cases of D2D communication. For illustration, ProSe enabled user equipments located in proximity to each other may engage in data or voice communication. The respective D2D communication is not transmitted to the radio access network of the mobile communication network.

In order to perform D2D communication, a user equipment must be capable of detecting one or several other user equipments which are located in proximity to the user equipment. The resources, e.g. the subcarrier frequencies, slots and/or symbols which the user equipment may use for the device-to-device discovery may be allocated to the user equipment by a base station. When different user equipments are located in proximity to each other, but are under the control of different base stations, they may use different resources for performing the device-to-device discovery and/or device-to-device communication. It is desirable that user equipments located in proximity to each other can reliably perform device-to-device discovery and/or device-to-device communication even when different device-to-device resources may be allocated to them. This may happen when the user equipments are controlled by different cells or are even attached to different public land mobile networks (PLMNs).

SUMMARY OF THE INVENTION

There is a need in the art for techniques which allow information on resources for device-to-device discovery and/or device-to-device communication to be provided to a user equipment. There is a need for such techniques which allow the user equipment to discover further user equipments even when the further user equipments are allocated further device-to-device resources different from the device-to-device resources allocated to the user equipment. There is a need for such techniques in which the amount of information which needs to be transmitted to the user equipment to enable such a discovery can be kept moderate.

According to exemplary embodiments of the invention, a method, a cellular network node, a user equipment, and a communication system are provided. The cellular network node compares device-to-device resources of a cell in which the user equipment is located to further device-to-device resources of at least one further cell. The cell and the at least one further cell may belong to different PLMNs or may be otherwise different from each other. An information element of a message is generated for transmission to the user equipment based on a result of the comparison.

By comparing the device-to-device resources which define a resource pool for device-to-device discovery and/or device-to-device communication in the cell and the further device-to-device resources which define a further resource pool for device-to-device discovery and/or device-to-device communication in the at least one further cell, information on the further device-to-device resources may be transmitted to the user equipment in a more compact way for at least some scenarios.

When comparing the device-to-device resources, a serving cell may be used as reference.

For illustration, the at least one information element may indicate that the further device-to-device resources fully overlap with the device-to-device resources. It is not required to transmit the same information in duplicate.

For further illustration, the at least one information element may indicate that the further device-to-device resources are offset from the device-to-device resources along time and/or frequency. The user equipment may then compute the further device-to-device resources from the device-to-device resources in combination with the at least one information element.

The at least one information element may included in a system information block (SIB) of a system information message.

In a method of providing information on resources for a device-to-device discovery and/or a device-to-device communication a comparison of device-to-device resources for a cell and further device-to-device resources for at least one further cell different from the cell is performed. At least one information element of a message for transmission to a user equipment is generated based on a result of the comparison.

As used herein, "performing the comparison" of the device-to-device resources for the cell and the further device-to-device resources for the at least one further cell refers to an act by which similarities and/or dissimilarities of the device-to-device resources and the further device-to-device resources can be detected. The comparison may be performed by directly comparing the device-to-device resources and the further device-to-device resources in a time-frequency resource grid. The comparison may be performed by establishing, by an OAM (Operations, Administration and Management) node in the core network, whether or not the device-to-device resources and the further device-to-device resources are identical or shifted relative to each other. Other techniques may be used to perform the comparison.

To perform the comparison, a pattern of the device-to-device resources in a time-frequency resource grid and a further pattern of the further device-to-device resources in the time-frequency resource grid may be compared with each other. The pattern may define the frequencies and times, relative to reference in the time-frequency resource grid, which respectively belong to the pool of resources from which resources may be allocated for the device-to-device discovery and/or device-to-device communication.

A serving cell may define a reference for the comparison.

Performing the comparison may comprise determining whether the pattern and the further pattern are identical.

Performing the comparison may comprise determining whether the further pattern is shifted in the time-frequency resource grid relative to the pattern.

The at least one information element may comprise information on a time offset between the pattern and the further pattern.

The time offset may be determined with reference to a serving cell.

The at least one information element may comprise information on a frequency offset between the pattern and the further pattern.

The frequency offset may be determined with reference to a serving cell.

Performing the comparison may comprise determining whether a frame timing of the cell and a frame timing of the at least one further cell are aligned. Thereby, it can be determined whether the frame timing of the cell may also serve as reference for defining the further device-to-device resources.

The at least one information element may comprise information on a time offset between the frame timing of the cell and the frame timing of the at least one further cell.

The at least one information element may be generated such that it includes a type identifier which defines whether the further pattern is identical to the pattern or shifted in the time-frequency resource grid relative to the pattern.

The at least one information element may be generated such that it includes a type identifier which defines whether the further pattern is identical to the pattern or shifted in the time-frequency resource grid relative to the pattern, and which further defines whether the frame timing of the cell and the frame timing of the at least one further cell are aligned.

The method may comprise performing a prioritization among the at least one further cell to determine for which one(s) of the at least one further cell information on the further device-to-device resources shall be provided to the user equipment.

The prioritization may be performed selectively only if it is determined that the further pattern is neither identical to the pattern nor shifted in the time-frequency resource grid relative to the pattern.

The prioritization may use data indicating frequencies and/or PLMN(s) transmitted by the user equipment as input parameter. The one(s) of the at least one further cell may be prioritized which has the further device-to-device resources in the indicated frequencies and/or which belongs to the indicated one or several PLMN(s).

The cellular network node may receive, from the user equipment, a request for additional information on the further device-to-device resources in response to transmitting the message to the user equipment. The cellular network node may generate a further message for transmission to the user equipment which includes the additional information. The further message may be a Radio Resource Control (RRC) signaling message.

The request may identify frequencies of the further device-to-device resources and/or one or several PLMNs. In response to the request, the cellular network node may identify the one(s) of the at least one further cell which has the further device-to-device resources in the indicated frequencies and/or which belongs to the indicated one or several PLMN(s).

The message may be generated such that it includes information on the device-to-device resources for the cell. The information on the device-to-device resources may define at which frequencies and/or at which times device-to-device discovery and/or device-to-device communication may be performed in the cell in which the user equipment is located.

The user equipment may determine the further device-to-device resources from the information on the device-to-device resources and the at least one information element included in the message.

The user equipment may determine a time offset and/or a frequency offset between the device-to-device resources and the further device-to-device resources based on the at least one information element. The user equipment may apply the time offset and/or frequency offset to the device-to-device resources to compute the further device-to-device resources.

The user equipment may perform a device-to-device discovery using resources determined based on the at least one information element to discover a further user equipment attached to a further cell. The further cell may belong to the same network as the cell in which the user equipment is located. The further cell and the cell may belong to different PLMNs.

A cellular network node according to an embodiment comprises a processing device configured to perform a comparison of device-to-device resources for a cell and further device-to-device resources for at least one further cell different from the cell. The processing device is configured to generate at least one information element of a message for transmission to a user equipment based on a result of the comparison. The cellular network node comprises an interface configured to output the at least one information element for transmission to the user equipment.

The cellular network node may be an eNodeB.

The cellular network node may be a node of a core network of a cellular communication network.

The cellular network node may be configured to perform the method according to any one of the various embodiments.

A user equipment according to an embodiment comprises a wireless interface configured for communication with a cellular communication network. The user equipment comprises a processing device configured to control the wireless interface to perform a device-to-device discovery and/or a device-to-device communication with a further user equipment. The processing device is configured to process a message received from the cellular communication network at the wireless interface to determine which further device-to-device resources are used by a further user equipment for the device-to-device discovery and/or a device-to-device communication, the further user equipment being located in a further cell different from the cell in which the user equipment is located.

The processing device may be configured to detect device-to-device discovery signals transmitted by the further user equipment at the further device-to-device resources based on the message received from the cellular communication network.

The message may comprise at least one information element which depends on a comparison between the device-to-device resources and the further device-to-device resources.

The at least one information element may indicate whether a pattern of the device-to-device resources in a time-frequency-resource grid is identical to a pattern of the further device-to-device resources in the time-frequency-resource grid.

The at least one information element may indicate whether the pattern of the further device-to-device resources in the time-frequency-resource grid is shifted along a time and/or frequency relative to the pattern of the device-to-device resources in the time-frequency-resource grid.

The at least one information element may be a type identified which depends on at least one of: a comparison of the pattern of the device-to-device resources to the further pattern of the further device-to-device resources, and/or a comparison of a frame timing of the cell to a frame timing of the further cell.

In response to the message, the user equipment may determine the further device-to-device resources based on the received message and may use the determined further device-to-device resources for discovering the further user equipment which is not under the control of the same base station as the user equipment.

The processing device may be configured to report frequencies and/or one or several PLMN(s) for which the user equipment would like to perform the device-to-device discovery and/or device-to-device communication to the cellular communication network.

The processing device may be configured to detect, based on the message, that the device-to-device resources and the further device-to-device resources are not arranged in a patterned way and may request additional information on the further device-to-device resources from the cellular communication network.

According to another embodiment, a mobile communication system is provided which comprises a cellular network node according to an embodiment and at least one user equipment according to an embodiment.

In the methods, devices, and systems according to embodiments, the device-to-device resources may be periodic uplink resources. The periodic uplink resources may be allocated in a semi-static manner. The periodic uplink resources may be divided into time-frequency resources. The periodic uplink resources may be divided into time-frequency resources according to frequency division multiplexing (FDM) and/or time division multiplexing (TDM).

In the methods, devices, and systems according to embodiments, the further device-to-device resources may be other periodic uplink resources. The other periodic uplink resources may be allocated in a semi-static manner. The other periodic uplink resources may be divided into time-frequency resources. The other periodic uplink resources may be divided into time-frequency resources according to frequency division multiplexing (FDM) and/or time division multiplexing (TDM).

In the methods, devices, and systems according to embodiments, a user equipment which is capable of performing device-to-device discovery may perform the device-to-device discovery and device-to-device communication over the same wireless interface over which it transmits and/or receives signals from a radio access network of the mobile communication network.

The methods, devices, and systems according to various embodiments provide a mechanism which allows a cellular communication network to provide information on resources for device-to-device discovery and/or device-to-device communication to one or several user equipments, while keeping the overhead of data that needs to be transmitted moderate.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings in which like or identical reference numerals designate like or identical elements.

DETAILED DESCRIPTION OF PREFERRED EMBODIMENTS

Figure 1:
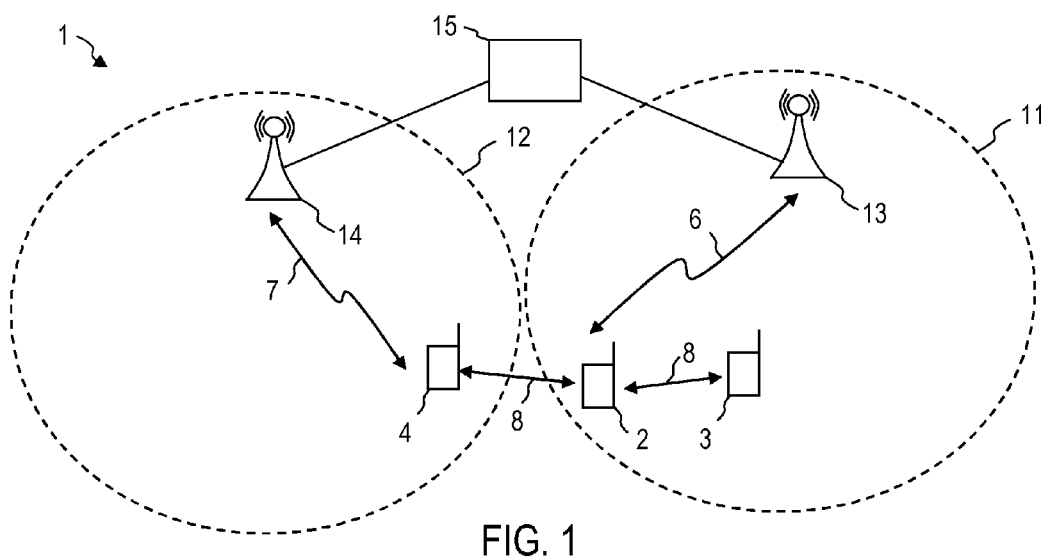
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for device-to-device (D2D) discovery and/or communication, it is to be understood that the techniques for D2D discovery and D2D communication may be used for a wide variety of use cases, including public safety use cases and other commercial use cases. While exemplary embodiments will be described in the context of certain cellular mobile communication networks, e.g. Long Term Evolution (LTE) networks, and corresponding message structures, the embodiments are not limited to such mobile communication techniques.

According to embodiments, a cellular network node informs a user equipment of resources, e.g. frequencies, which can be used for device-to-device discovery and/or device-device communication by further user equipment(s) located in further cells. The further cells may be neighboring cells of the same public land mobile network (PLMN) or may be cells of a PLMN different from the one to which the user equipment is attached.

The resource pool from which resources can be allocated for device-to-device discovery and/or device-device communication in the cell in which the user equipment is located will be referred to as "device-to-device resources" herein.

The resource pool from which resources can be allocated for device-to-device discovery and/or device-device communication in a further cell different from the cell in which the user equipment is located will be referred to as "further device-to-device resources" herein.

It is to be understood that the "device-to-device resources" and the "further device-to-device resources" may include frequencies which are presently not being used by any user equipment for performing device-to-device discovery and/or device-to-device resources. I.e., the information may also cover resources which are presently not allocated to any user equipment, but which are provided for being allocated for device-to-device discovery, for example.

In order to reduce the amount of data which needs to be signaled to the user equipment to indicate the further device-to-device resources in addition to the device-to-device resources, deployment scenarios are categorized into a finite set of different types. The type is signaled to the user equipment. A type identifier may be included in one or several bits of a system information block. The type identifier may define whether the cell in which the user equipment is located and one or several further cells within proximity range of the cell have identical resource pools for device-to-device discovery and/or device-to-device communication. The type identifier may define whether the cell in which the user equipment is located and one or several further cells within proximity range of the cell have resource pools which are shifted by a offset in the time and/or frequency direction, but which share identical patterns. For illustration, the type identifier may define whether the further device-to-device resources of the further cell have the same repetition rate as the device-to-device resources of the cell. When performing the comparison and/or when determining the offset, the comparison may be performed with reference to a serving cell and/or the offset(s) may be determined with reference to the serving cell.

Additional information may be signaled to the user equipment. For illustration, a cell list including cell identifiers of those further cells which have the same resource pool for device-to-device discovery and/or device-to-device communication as the cell in which the user equipment is located may be transmitted. A cell list including cell identifiers of those further cells which have further device-to-device resources which correspond to the device-to-device resources of the cell shifted along the time and/or frequency axis may be transmitted to the user equipment. A cell list including cell identifiers of those further cells which have further device-to-device resources which are not related to the device-to-device resources of the cell may be transmitted to the user equipment.

The user equipment may process the message in which the type identifier is included. The user equipment may compute the further device-to-device resources of at least one further cell different from the cell to which the user equipment is attached using the type identifier.

For illustration, when the type identifier indicates that the further device-to-device resources are identical to the device-to-device resources of the cell to which the user equipment is attached, the user equipment knows that it may perform device-to-device discovery for those adjacent cells by monitoring the same frequencies as for device-to-device discovery within the cell in which the user equipment is located.

For further illustration, when the type identifier indicates that the further device-to-device resources are shifted compared to the device-to-device resources in the time and/or frequency direction, the user equipment may add an offset in the time and/or frequency direction to the device-to-device resources of the cell to which it is attached, to thereby determine the further device-to-device resources. The offset may also be signaled to the user equipment together with the type identifier or in a different system information block (SIB).

For further illustration, when the type identifier indicates that the further device-to-device resources do not have the same pattern as the device-to-device resources even when taking into account possible shifts in the time and/or frequency direction, the user equipment may retrieve information on the further device-to-device resources from a cellular network node. The further device-to-device resources for some further cells in proximity to the cell may be signaled in the same SIB as the type identifier. The further device-to-device resources for still other cells in proximity to the cell may be transmitted to the user equipment in response to a request from the user equipment.

FIG. 1 shows a communication system 1 according to an embodiment. The communication system 1 includes a mobile communication system which is configured as a cellular communication network. The cellular communication network may comprise a plurality of base stations 13, 14. Each base station may provide coverage for a cell 11, 12. The base stations may communicate with each other via wireless radio communications or via an operator core network. The cellular communication network may be a Long Term Evolution (LTE) network. A radio access network (RAN) of the cellular communication network may be an evolved UTRAN (E-UTRAN), with the base stations 13, 14 respectively being an evolved Node B (eNodeB). The base station 11 may be connected to a Mobility Management Entity (MME) and/or Serving Gateway (S-GW) 15 in the operator core network.

The base station 13 provides a radio cell 11 in which user equipments (UEs) 2, 3 may communicate directly with the base station 13 via radio frequency communication 6. The base station 14 provides a radio cell 12 in which UEs 4 may communicate directly with the base station 14 via radio frequency communication 7. The UEs 2, 3, 4 may respectively have a wireless interface for communication with the E-UTRAN.

The UE 2 and at least one further UE 4 are capable of performing a D2D discovery for D2D communication. According to the terminology in the pertinent field of the art, the term D2D communication refers to a radio communication between UEs which is performed directly between the UEs. The radio signals 8 transmitted in the D2D discovery and communication may not be processed by the base stations 13, 14. The radio signals 8 transmitted in the D2D discovery and communication may not pass the RAN of the communication network. The radio signals 8 transmitted in the D2D discovery and communication may not be processed by a core network of the wireless cellular communication network. The UE 2 and the further UE 4 which are configured for D2D communication and discovery may respectively use the same wireless interface for communicating with the RAN and for D2D communication.

In order to identify suitable communication partners for D2D communication, a UE 2 capable of performing D2D communication may be configured to perform a D2D discovery. In the D2D discovery, a UE may discover at least one further UE 4 located in proximity of the UE and configured to engage in D2D communication with the UE. The D2D discovery may include a radio signaling between UE 2 and the further UE 4 which is performed directly between the UEs. The radio signals 8 transmitted in the D2D discovery may not be processed by the base stations 13, 14. The radio signals 8 transmitted in the D2D discovery may not pass through the RAN of the cellular communication network. The radio signals 8 transmitted in the D2D discovery may not be processed by a core network of the wireless cellular communication network. The UE 2 and the further UE 4 which are configured for D2D communication may use the same wireless interface for communicating with the RAN and for D2D discovery.

A UE 2 configured for D2D discovery and D2D communication may also be referred to as Proximity Service (ProSe)-enabled UE in the art. Not all UEs communicating with the wireless cellular communication network need to be configured for D2D discovery and D2D communication.

The UE 2 and the further UE 4 which are configured for D2D communication may use allocated resources for the D2D discovery and/or communication. The allocated resources for the D2D discovery and/or communication may be allocated to the UE 2 by the base station 13 and to the further UE 4 by a further base station 14. The allocated resources may respectively be allocated in a semi-static manner. The allocated resources may be periodic uplink resources. The allocated resources may be divided in the time domain, e.g. according to time division multiplexing (TDM), and/or in the frequency domain, e.g. according to frequency division multiplexing (FDM). The UE 2 and the further UE 4 may use at least one physical resource block for the D2D discovery and/or communication which would otherwise be used for uplink communication.

In order to ensure that the UE 2 can discover a further UE 4 which is attached to the further cell 12 different from the cell 11, the cellular communication network provides information on the further device-to-device resources of the further cell 12 to the UE 2. In order to reduce the signaling overhead, a cellular network node of the cellular communication network compares the further device-to-device resources of the further cell 12 to the device-to-device resources of the cell 11. The cellular network node may be the base station 13 or a cellular network node 15 in the core network, for example.

The cellular network node determines a type identifier as a result of the comparison of the further device-to-device resources of the further cell 12 and the device-to-device resources of the cell 11. If the device-to-device resources from which resources may be allocated for D2D discovery and/or communication in the cell 11 and the further device-to-device resources from which resources may be allocated for D2D discovery and/or communication in the further cell 12 are identical, the type identifier may be determined to be a first type identifier. If the device-to-device resources from which resources may be allocated for D2D discovery and/or communication in the cell 11 and the further device-to-device resources from which resources may be allocated for D2D discovery and/or communication in the further cell 12 are not identical but are shifted in the time and/or frequency axis while having the same pattern, the type identifier may be determined to be a second type identifier. Alternatively or additionally, the type identifiers may depend on whether the frame timing of the cell 11 and the further cell 12 are aligned.

While only one further cell 12 is shown in FIG. 1, it will be understood that the techniques apply also when there is a plurality of further cells different from the cell and located within proximity range to the cell 11. The cellular network node, e.g. the base station 13 or a cellular network node 15 in the core network, may identify all those further cells within the proximity range of the cell 11 which have further device-to-device resources which are identical to the device-to-device resources of the cell 11. A cell list with cell identifiers of these further cells may be transmitted to the UE 2 in combination with a first type identifier which indicates that the resource pools for D2D discovery and/or communication are identical.

The cellular network node, e.g. the base station 13 or a cellular network node 15 in the core network, may identify all those further cells within the proximity range of the cell 11 which have further device-to-device resources which are not identical to the device-to-device resources of the cell 11 but which are patterned in the sense that the further device-to-device resources can be obtained by shifting the device-to-device resources along the time axis and/or frequency axis. A cell list with cell identifiers of these further cells may be transmitted to the UE 2 in combination with a second type identifier which indicates that the resource pools for D2D discovery and/or communication are shifted relative to each other, but have a same pattern in a time-frequency domain grid apart from the offset in the time or frequency direction.

Different type identifiers may be used to indicate whether the frame timing is aligned or not aligned for the further cell(s) 12 and the cell 11. If the frame timing is not aligned, a time offset between the frame timing of the cell 11 and the further cell(s) 12 may be signaled to the UE 2.

The UE 2 may use the type identifier in combination with the device-to-device resources of the cell 11 and, if applicable, further in combination with time and/or frequency offsets which are signaled to the UE 2 to determine at which the frequencies and at which times the further UE 4 transmits D2D discovery signals. The UE 2 may listen for D2D discovery signals from the further UE 4 by monitoring frequencies of the further device-to-device resources. The further device-to-device resources do not need to be signaled explicitly to the UE 2 in all cases. Rather, as long as there is some relation between the device-to-device resources in the cell 11 and the further device-to-device resources of the further cell 4, a type identifier which defines this relation is signaled to the UE 2. Signaling overhead may thereby be kept more moderate.

It will be appreciated that the further UE 4 may be informed of the device-to-device resources of the cell 11 from which resources are allocated for device-to-device discovery to the UE 2 in a similar way. I.e., the further base station 14 or a cellular network node 15 in the core network may generate an information element which classifies the relation of the device-to-device resources in the cell 11 and the further device-to-device resources in the further cell 12. The further UE 4 may use this information element to determine at which frequencies and/or at which times it shall monitor for device-to-device discovery signals from the UE 2.

The techniques disclosed herein are also applicable to inform the UE 2 attached to a cell of a PLMN of the further device-to-device resources of a further cell of a further PLMN which is different from the PLMN. Thereby, the UE 2 is enabled in an efficient way to determine which resources need to be monitored to discover further UEs attached to different PLMNs.

Figure 2:
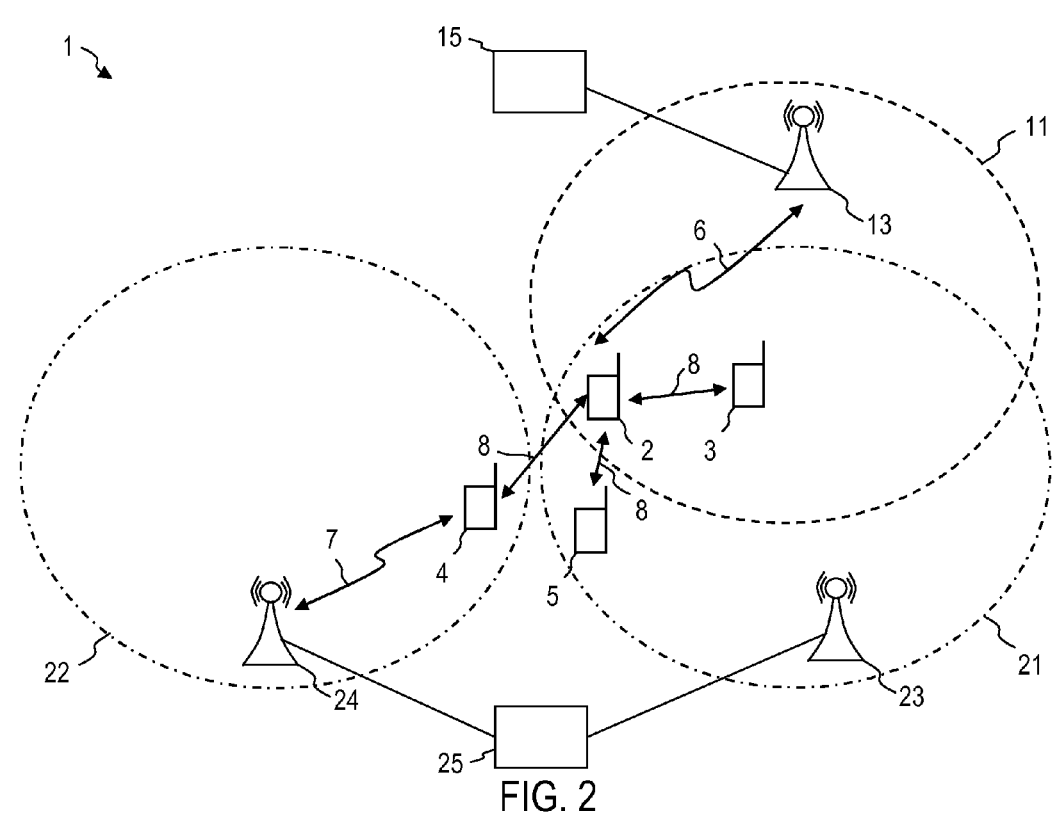
FIG. 2 shows a further communication system according to an embodiment.

FIG. 2 illustrates a communication system 1 according to an embodiment. The communication system 1 includes a first cellular communication network having a first PLMN. The first PLMN includes cell(s) 11 served by base station(s) 13. The communication system 2 includes a second cellular communication network having a second PLMN. The second PLMN includes cell(s) 21, 22 served by base stations 23, 24. The base station(s) 23, 24 may be connected to a MME 25 or other cellular network node of a core network. Further UE(s) 4, 5 may camp on cell(s) 21, 22 of the second PLMN. The further UE(s) 4, 5 may communicate with the cell(s) 21, 22 of the second PLMN over the eUTRA air interface.

The first cellular communication network may retrieve information on the further device-to-device resources available for D2D discovery and/or communication in the cells 21, 22 from the second cellular communication network. A cellular network node, e.g. the base station 13 or a cellular network node 15 in the core network of the first cellular communication network, may compare the device-to-device resources of the cell 11 to the further device-to-device resources of the cells 21, 22. A type identifier which depends on similarities between the device-to-device resources of the cell 11 and the further device-to-device resources of the cells 21, 22 may be signaled to the UE 2. The UE 2 may determine the further device-to-device resources even when the further device-to-device resources are not explicitly signaled to the UE 2. For illustration, the UE 2 may determine from the type identifier whether the further device-to-device resources are identical to the device-to-device resources available in the cell 11. The UE 2 may determine from the type identifier whether the further device-to-device resources are shifted relative to the device-to-device resources available in the cell 11 along the time axis and/or frequency axis, while defining a same pattern in the time-frequency domain grid. The UE 2 may use the information to perform a device-to-device discovery, e.g. by frequencies which depend on the type identifier to detect D2D discovery signals from the further UEs 4, 5 attached to the second PLMN.

Likewise, the second cellular communication network may retrieve information on the device-to-device resources from the first cellular communication network. A cellular network node, e.g. the base station 23, 24 or a cellular network node 25 in the core network of the second cellular communication network, may compare the device-to-device resources of the cell 11 and the further device-to-device resources of the cells 21, 22. A type identifier which depends on similarities between the device-to-device resources of the cell 11 and the further device-to-device resources of the cells 21, 22 may be signaled to the further UEs 4, 5. The further UEs may use the type identifier to perform D2D discovery.

The comparison between the device-to-device resources and the further device-to-device resources may be performed in a wide variety of different ways. For illustration, an OAM (Operations, Administration and Management) node in the core network may maintain a table which defines a neighbor mapping between cells. The OAM node may update the table such that it includes information on whether the device-to-device resources and the further device-to-device resources are related to each other. The OAM node may provide this information to a base station.

In any one of the various embodiments, information on the device-to-device resources available in a cell and type identifier(s) associated with at least one further cell may be broadcast by the base station 11 in a system information block (SIB) of a system information message (SIM). The base station 11 may be configured to transmit the information on the device-to-device resources available in a cell and type identifier(s) in a system information message as defined in technical specification 3GPP TS 25.331, entitled "3rd Generation Partnership Project; Technical Specification Group Radio Access Network; Radio Resource Control (RRC); Protocol specification (Release 12)". The base station 11 may be configured to transmit the information on the device-to-device resources available in a cell and type identifier(s) in a system information message as defined in chapter 10.2.48 of technical specification 3GPP TS 25.331 V12.2.0 (June 2014), entitled "3rd Generation Partnership Project; Technical Specification Group Radio Access Network; Radio Resource Control (RRC); Protocol specification (Release 12)". The base station 11 may be configured to transmit the information on the device-to-device resources available in a cell and type identifier(s) in a system information message as defined in technical specification 3GPP TS 36.331, entitled "3rd Generation Partnership Project; Technical Specification Group Radio Access Network; Evolved Universal Terrestrial Radio Access (E-UTRA); Radio Resource Control (RRC); Protocol specification (Release 12)". The base station 11 may be configured to transmit the information on the device-to-device resources available in a cell and type identifier(s) in a system information message as defined in chapter 5.2.2 of technical specification 3GPP TS 36.331 V11.5.0 (November 2013), entitled "3rd Generation Partnership Project; Technical Specification Group Radio Access Network; Evolved Universal Terrestrial Radio Access (E-UTRA); Radio Resource Control (RRC); Protocol specification (Release 11)".

Methods, devices and systems according to embodiments will be explained in more detail with reference to FIG. 3 to FIG. 16 below.

In the following, the resource pool of resources which are available for device-to-device discovery and/or communication in the cell in which the user equipment is located are referred to as "device-to-device resources". The resource pool of resources which are available for device-to-device discovery and/or communication in further cells within proximity range of the cell are referred to as "further device-to-device resources". It is to be understood that the further device-to-device resources may, but do not need to be different from the device-to-device resources.

Figure 3:
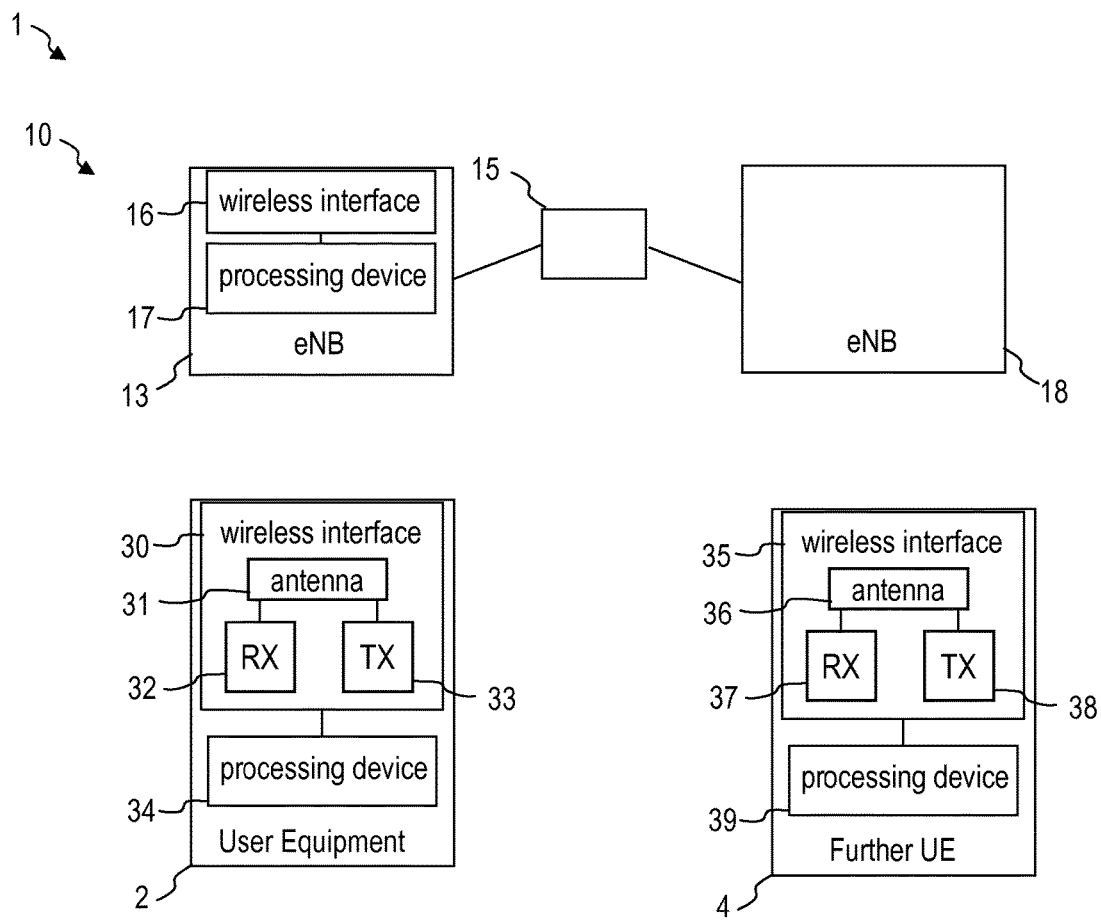
FIG. 3 is a block diagram representation of a communication system according to an embodiment.

FIG. 3 is a schematic block diagram of a communication system 1 according to an embodiment. The base station 13 of the RAN 10 is connected to a node 15 of the RAN or the core network (CN). A further base station 18 may belong to the same PLMN or a different PLMN than the base station 13. The base station 13 may broadcast at least one SIB which indicates the device-to-device resources of the cell to the UE 2. The further base station 18 may broadcast at least one SIB which indicates the further device-to-device resources of the cell to the further UE 4. The device-to-device resources and the further device-to-device resources may each be periodic uplink resources.

The cellular network node 15 or a processing device 17 of the base station 13 may compare the device-to-device resources and the further device-to-device resources. The comparison may include determining whether the device-to-device resources and the further device-to-device resources are identical, i.e., whether they coincide in time and frequencies. The comparison may include determining whether the device-to-device resources and the further device-to-device resources are arranged in a patterned way in the time-frequency resource grid. To this end, it may be determined whether resource blocks of the device-to-device resources and resource blocks of the further device-to-device resources may be associated with one another so that there is a fixed offset in time and frequency between respectively one of the resource blocks of the further device-to-device resources and one of the resource blocks of the device-to-device resources. The comparison may include determining whether a frame timing of the cell served by the base station 13 and of the further cell served by the further base station 18 is aligned. A type identifier may be selected which defines the deployment scenario. The type identifier may define whether there is a relation between the device-to-device resources and the further device-to-device resources. The type identifier may define whether there is a relation between the device-to-device resources and the further device-to-device resources which allows the UE 2 to derive the further device-to-device resources from the device-to-device resources, using additional parameters such as time or frequency offsets when required.

The UE 2 has a wireless interface 30. The wireless interface 30 may be configured to communicate with the RAN 10. The wireless interface 30 may be configured for communication over the E-UTRA air interface.

The UE 2 has a processing device 34 connected to the wireless interface 30. The processing device 34 may comprise one or several microprocessors, one or several microcontroller, one or several processors, one or several control devices, one or several application specific integrated circuits (ASICs) and/or a combination of such devices. The processing device 34 may be configured to control the wireless interface 30 to detect a further UE 4 located in proximity to the UE 2 even when the further UE 4 is not attached to the same cell as the UE 2. The processing device 34 may be configured to control the wireless interface 30 to perform a D2D discovery. The processing device 34 may be configured to control a transmitter path 33 of the wireless interface 30 to transmit a signal to the further UE 3 via an antenna 31 to indicate that the UE 2 is looking for a further UE for D2D communication and/or to indicate that the UE 2 would be capable of performing D2D communication. The processing device 34 may be coupled to a receiver path 32 of the wireless interface 30 to process a device-to-device discovery signal received from the further UE 3. The processing device 34 may control the receiver path 32 by monitoring the further device-to-device resources to discover the further UE 4. The receiver path 32 may be controlled such that frequencies are monitored to detect the device-to-device discovery signal from the further UE 4, with the frequencies being determined based on the device-to-device resources of the cell served by the base station 13 and depending on the type identifier which defines how the further device-to-device resources are related to the device-to-device resources.

The processing device 34 is configured to monitor physical resources allocated for the D2D discovery and/or for the D2D communication in the further cell to detect the further UE 4. The processing device 34 is configured to determine whether the further device-to-device resources allocated to the further UE 4 by the further base station 18 are related to the device-to-device resources allocated to the UE 2 by the base station 13. The UE 2 may be configured to determine the further device-to-device resources from the device-to-device resources broadcast in a SIB by the base station 13 and the type identifier broadcast in a SIB by the base station 13, for at least some values of the type identifier. At least some other values of the type identifier may optionally trigger the UE 2 to perform dedicated RRC signaling with the base station 13 to request additional information on the further device-to-device resources.

The further UE 4 has a wireless interface 35 including an antenna 36, a receiver path 37, and a transmitter path 38, and a processing device 39. These entities may be configured in the same way as explained for the UE 2. In particular, the wireless interface 35 may be configured to communicate with the RAN 10. The wireless interface 35 may be configured for communication over the E-UTRA air interface. The wireless interface 35 may further be configured for D2D discovery and communication with the wireless interface 30 of the UE 2. The processing device 39 of the further UE 4 may be configured to control the wireless interface 35 to transmit D2D discovery signals using further device-to-device resources which are signaled to the further UE 4 by the further base station 18. The device-to-device discovery signals are transmitted directly between the wireless interface 35 of the further UE and the wireless interface 30 of the UE, without being processed or relayed by the RAN 10.

The base station 13 includes a wireless interface 16. The wireless interface 16 may be configured to communicate with the UE 2. The wireless interface 16 may be configured for communication over the E-UTRA air interface.

A processing device 17 of the base station 13 may control the wireless interface 16 to provide information on both the device-to-device resources and the further device-to-device resources to the UE 2. The processing device 17 may comprise one or several microprocessors, one or several microcontroller, one or several processors, one or several control devices, one or several application specific integrated circuits (ASICs) and/or a combination of such devices.

The processing device 17 may compare the device-to-device resources of the cell served by the base station 13 and the further device-to-device resources of the further cell served by the further base station 18. The processing device 17 may determine a type identifier which defines whether and in which way the device-to-device resources of the cell served by the base station 13 and the further device-to-device resources of the further cell served by the further base station 18 are related to each other.

The processing device 17 may control the wireless interface 16 to transmit information on the further device-to-device resources to the UE 2. If the device-to-device resources of the cell served by the base station 13 and the further device-to-device resources of the further cell served by the further base station 18 are related to each other, e.g. are identical or have same patterns shifted relative to each other in the time-frequency resource grid, the processing device 17 does not need to explicitly signal the further device-to-device resources to the UE 2. Rather, a type identifier which depends on the comparison is included. Offset parameters and/or cell lists may also be included in SIB transmitted to the UE 2, as will be explained in more detail below.

Figure 4:
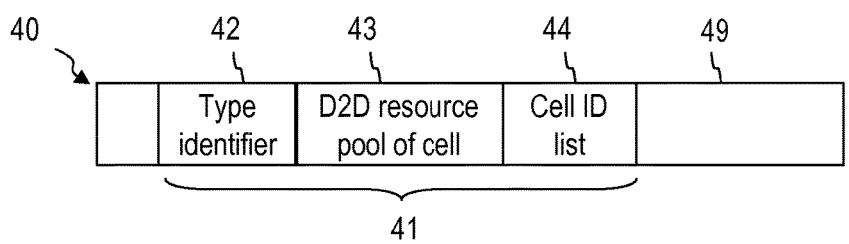
FIG. 4 shows a system information block which may be transmitted in accordance with embodiments.

FIG. 4 is a diagram which illustrates a message which may be broadcast by the base station 13 to provide information on the further device-to-device resources of further cell(s) within proximity range to the UE 2. The message 40 may be a system information message. The message 40 may include a system information block. The system information block may include one or several information elements 42 which depend on a comparison of the device-to-device resources and the further device-to-device resources.

The base station may signal information on its own device-to-device resources 43 to the user equipment. The device-to-device resources 43 may be defined by the resource blocks in the time-frequency resource grid from which resources are allocated for D2D discovery and/or communication.

The base station may signal a type identifier 42 to the UEs in its cell, including the UE 2. The type identifier depends on a comparison of the device-to-device resources of the cell and the further device-to-device resources of at least one further cell. The type identifier may define whether there is a relation between the device-to-device resources of the cell and the further device-to-device resources of at least one further cell.

The base station may signal a cell ID list 44 of cell IDs to the UEs in its cell, including the UE 2. The cell ID list 44 may define the further cell(s) in proximity range of the cell to which the type identifier 42 is applicable.

Additional information may optionally be included in the message 40. For illustration, if the further cell(s) identified by the cell ID list 44 have further device-to-device resources which are identical to each other, but offset from the device-to-device resources of the cell in a patterned relation, the message 40 may include the time offset and/or frequency offset. The additional information 49 may depend on the type identifier 42.

If the type identifier 42 indicates that the further cell(s) identified by the cell ID list 44 have further device-to-device resources which are identical to the device-to-device resources of the cell, the base station does not need to explicitly broadcast the further device-to-device resources. The UE 2 will determine, based on the type identifier 42, that the D2D discovery of further UEs located in any one of the further cells identified by the cell ID list 44 may be performed using the same resources as for discovery within the cell in which the UE 2 is located.

The cell ID list may include intra-frequency cells, inter-frequency cells, and/or PLMN cells which have further device-to-device resources which are related to the device-to-device resources in the manner defined by the type identifier 42.

The information 41 including the type identifier 42, the cell ID list 44 and the device-to-device resource information 43 for one cell may be used by the UE to determine the further device-to-device resources for a plurality of further cells defined by the cell ID list 44.

Figure 5:
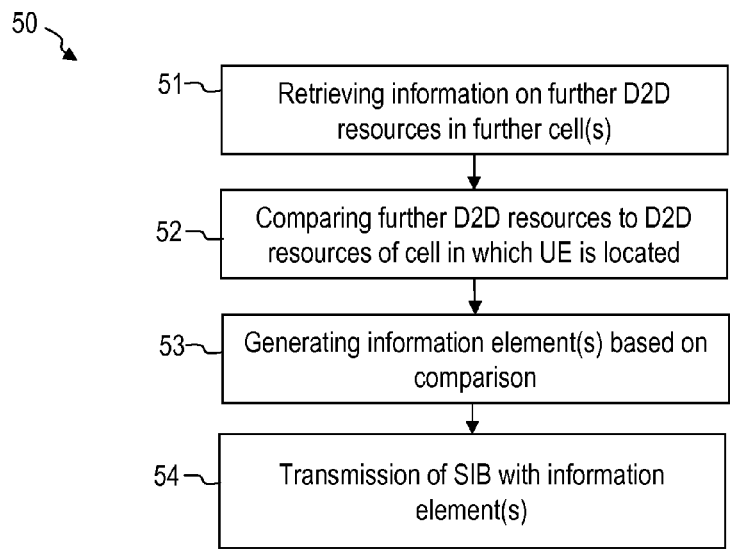
FIG. 5 is a flow chart of a method according to an embodiment.

FIG. 5 is a flow chart of a method 50 according to an embodiment. The method may be performed by a cellular network node. The cellular network node may be an eNodeB or a node of a core network.

At 51, the cellular network node retrieves information on further device-to-device resources for one or several further cell(s). The cellular network node may retrieve this information from a further base station. The further base station may belong to the same or a different PLMN as the base station. The cellular network node may retrieve this information over an interface between core networks associated with different PLMNs.

At 52, the cellular network node performs a comparison between the further device-to-device resources and the device-to-device resources. The comparison may be performed for each further cell in proximity range of the cell and supporting device-to-device discovery and communication.

The comparison may comprise determining whether the device-to-device resources and the further device-to-device resources are identical. The comparison may comprise determining whether a pattern of the device-to-device resources and a further pattern the further device-to-device resources are related to each other by a shift along the time and/or frequency axis. The comparison may comprise identifying all further cell(s) in proximity to the cell which further device-to-device resources identical to and/or otherwise related to the device-to-device resources of the cell.

At 53, one or several information elements may be generated for transmission. The one or several information elements may comprise a type identifier which may indicate one out of a finite set of deployment scenarios. The type identifier may define whether the cell and the at least one further cell are synchronous or asynchronous. The type identifier may define whether the cell and the at least one further cell use the same or different resources for the device-to-device discovery and/or communication.

At 54, a SIB is broadcast to transmit the at least one information element to the UE 2. The SIB may additionally include device-to-device resource information defining the resource blocks for D2D discovery and/or communication used in the cell of the broadcasting base station. The SIB may include a cell ID list defining for which further cell(s) the type identifier is applicable. The SIB may optionally include additional parameters.

In response to receiving the SIB, the UE 2 may determine which further device-to-device resources may be used by further UEs which camp on further cells different from the cell to which the UE 2 is attached. The UE 2 may monitor these further radio resources to discover the further UEs.

The way in which the UE 2 determines the further device-to-device resources may depend on the type identifier. For a first type identifier which indicates that the further cells have a frame timing aligned with that of the cell and that the further cells use further device-to-device resources identical to the device-to-device resources of the cell, the UE 2 knows that the further device-to-device resources are identical to the device-to-device resources.

For a second type identifier which indicates that the further cells have a frame timing aligned with that of the cell and that the further cells use further device-to-device resources which are shifted to the device-to-device resources of the cell along the time axis and/or the frequency axis in the time-frequency resource grid, the UE 2 may add a time offset and/or a frequency offset to the signaled device-to-device resources to thereby obtain the further device-todevice resources. The required time offset and/or frequency offset may be broadcast in the SIB.

For a third type identifier which indicates that the further cells have a frame timing which is offset from a frame timing of the cell, and that the further cells use further device-to-device resources which are shifted to the device-to-device resources of the cell along the time axis and/or the frequency axis in the time-frequency resource grid, the UE 2 may perform a shifting in the time axis and/or frequency axis to derive the further device-to-device resources. The required time offset and/or frequency offset may be broadcast in the SIB.

For a fourth type identifier which indicates that the further device-to-device resources are unrelated to the device-to-device resources of the cell, the further device-to-device resources may be explicitly signaled to the UE 2 in the SIB. The further cell(s) for which the further device-to-device resources are explicitly signaled in the SIB may be selected by the cellular network node in dependence on frequencies and/or PLMNs in which the UE 2 is interested. The UE 2 may optionally request additional information on the further device-to-device resources. For illustration, the UE 2 may transmit a request to the cellular network node to request information on the further device-to-device resources which are located at certain frequencies and/or which are used by a specific PLMN.

Figure 6:
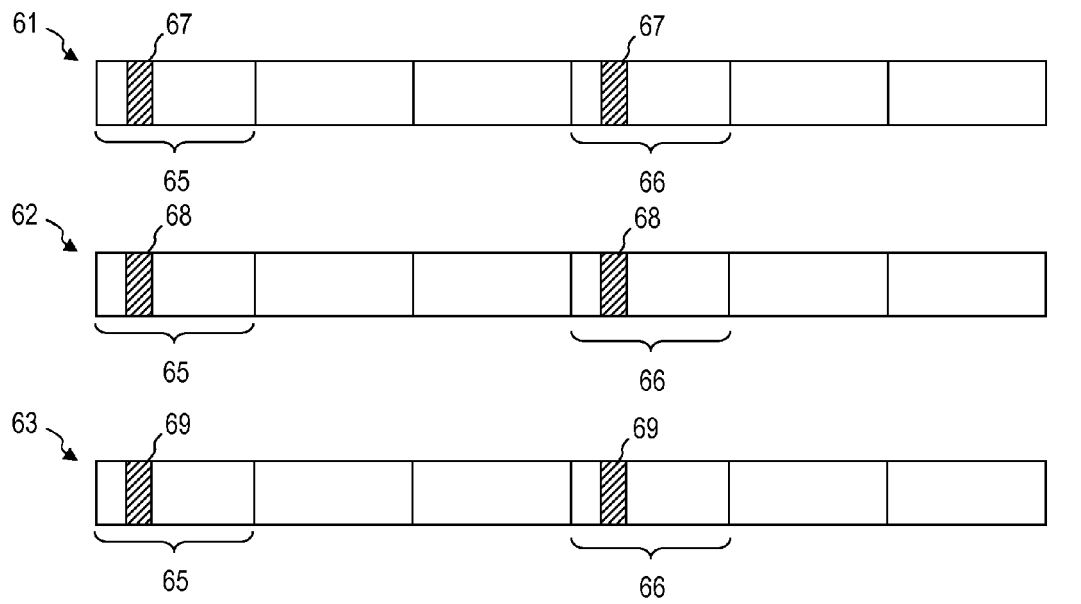
FIG. 6 is a graph illustrating device-to-device resources and further device-to-device resources which are communicated to a user equipment according to an embodiment.
Figure 7:
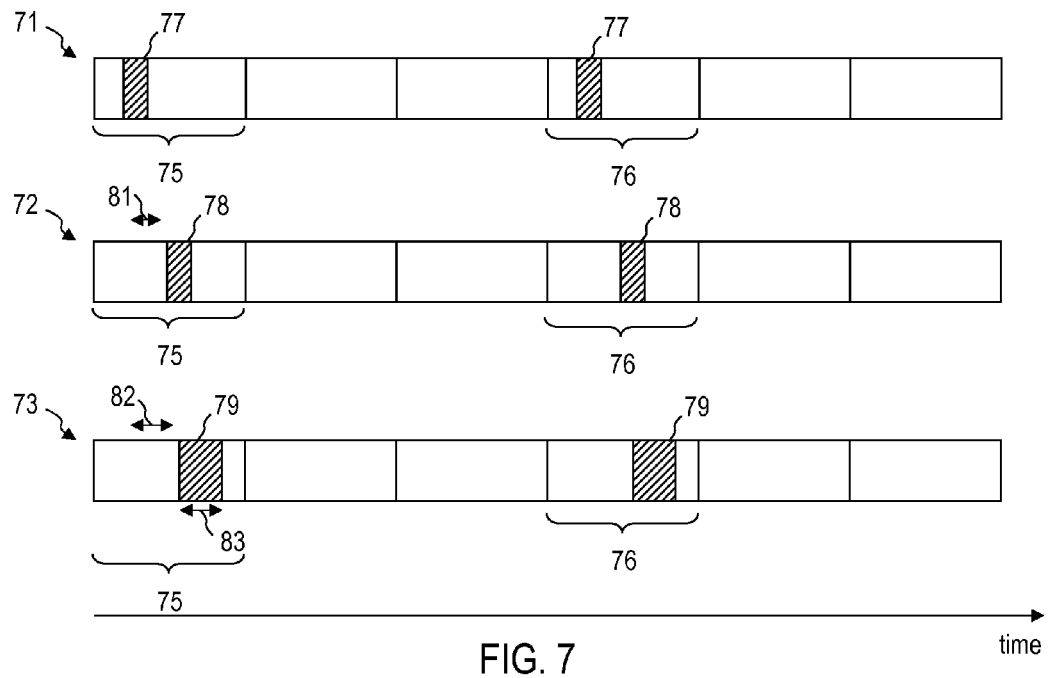
FIG. 7 is another graph illustrating device-to-device resources and further device-to-device resources which are communicated to a user equipment according to an embodiment.
Figure 8:
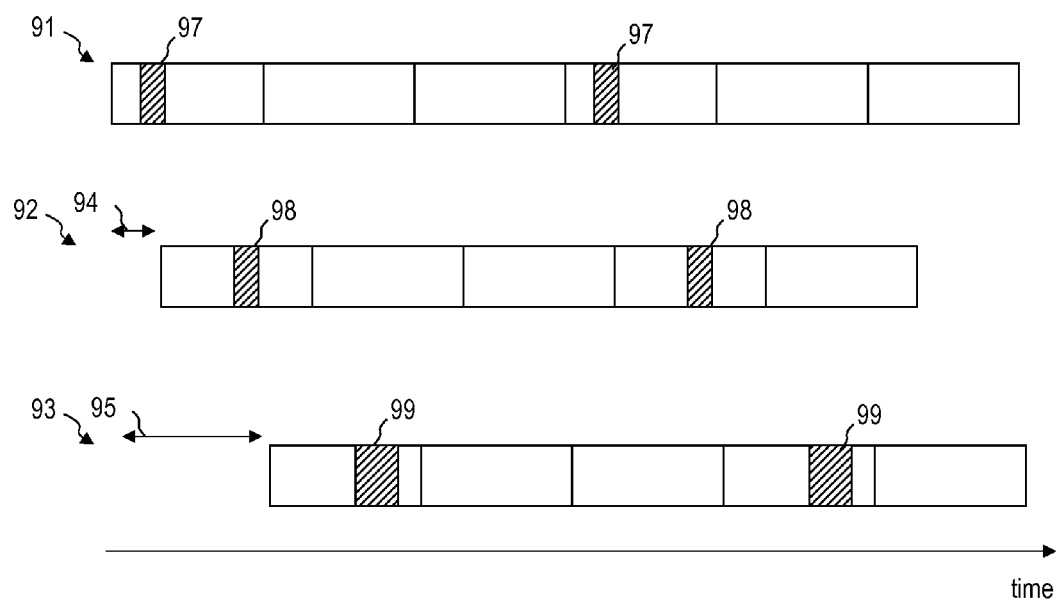
FIG. 8 is another graph illustrating device-to-device resources and further device-to-device resources which are communicated to a user equipment according to an embodiment.

FIG. 6, FIG. 7, and FIG. 8 are diagrams for explaining the determination of at least one information element for broadcasting to UEs based on a comparison of device-to-device resources for a cell and further device-to-device resources for at least one further cell.

FIG. 6 shows resources 61 of a cell and resources 62, 63 of further cells which may be located within proximity range of the cell. Device-to-device resources 67 of the cell may form a pool from which resources may be allocated for device-to-device discovery and/or communication to UEs by the cell. The device-to-device resources may comprise subframes which are repeated periodically in frames 65, 66. The device-to-device resources 67 may comprise resource blocks of uplink resources which would otherwise be used for uplink communication.

Further device-to-device resources 68 may be available for a further cell. The further cell may be in proximity range of the cell. The further cell may fully or partially overlap with the cell in which the device-to-device resources 67 are available. The further device-to-device resources 68 may form a pool from which resources may be allocated for device-to-device discovery and/or communication to UEs by the further cell. The further device-to-device resources 68 may comprise subframes which are repeated periodically in frames 65, 66. The further device-to-device resources 68 may comprise resource blocks of uplink resources which would otherwise be used for uplink communication.

Further device-to-device resources 69 may be available for another further cell. The other further cell may be in proximity range of the cell. The further device-to-device resources 69 may be configured in the same way as the further device-to-device resources 68.

In methods, devices and systems of embodiments, a cellular network node may compare the further device-to-device resources 68, 69 to the device-to-device resources 67. The cellular network node may determine that the further device-to-device resources 68, 69 and the device-to-device resources 67 are identical, i.e., have the same locations in the time-frequency resource grid, and that the frame timing of the cell and the further cells are aligned.

The cellular network node may cause a message to be broadcast in the cell having the device-to-device resources 67, with the message including a type identifier which indicates that the further device-to-device resources 68, 69 and the device-to-device resources 67 are identical. The message may include a cell ID list of cell identifiers of the further cell(s) which are sufficiently close to the cell to be reachable by device-to-device communication and which have the further device-to-device resources 68, 69 which are identical to the device-to-device resources 67.

In response to receiving such a broadcast message, the UE 2 may determine that the further cell(s) specified by the cell ID list have further device-to-device resources which are identical to the device-to-device resources of the cell in which the UE is located. The UE 2 may monitor the further device-to-device resources to discover a further UE which is under the control of one of the further cells.

The UE 2 may discover further UEs attached to further cells different from the cell to which the UE 2 is attached, without requiring the cellular communication network to explicitly inform the UE 2 of the further device-to-device resources for such further cells.

FIG. 7 shows resources 71 of a cell and resources 72, 73 of further cells which may be located within proximity range of the cell. Device-to-device resources 77 of the cell may form a pool from which resources may be allocated for device-to-device discovery and/or communication to UEs by the cell. The device-to-device resources may comprise subframes which are repeated periodically in frames 75, 76. The device-to-device resources 77 may comprise resource blocks of uplink resources which would otherwise be used for uplink communication.

Further device-to-device resources 78 may be available for a further cell. The further cell may be in proximity range of the cell, i.e., a UE in the cell and a further UE in the further cell may be close enough to perform D2D discovery and communication. The further cell may fully or partially overlap with the cell in which the device-to-device resources 77 are available. The further device-to-device resources 78 may form a pool from which resources may be allocated for device-to-device discovery and/or communication to UEs by the further cell. The further device-to-device resources 78 may comprise subframes which are repeated periodically in frames 75, 76. The further device-to-device resources 78 may comprise resource blocks of uplink resources which would otherwise be used for uplink communication. Further device-to-device resources 79 may be available for another further cell. The other further cell may be in proximity range of the cell. The further device-to-device resources 79 may be configured similarly as the further device-to-device resources 78.

The further device-to-device resources 78 are not identical to the device-to-device resources 77, but are shifted relative thereto. The device-to-device resources 77 form a pattern in the time-frequency domain grid. The further device-to-device resource 78 form a further pattern in the time frequency resource grid, which corresponds to the pattern of the device-to-device resources 77 but positioned differently in the time-frequency resource grid. The pattern may be defined by the time shifts and optionally frequency shifts between resource blocks of the device-to-device resources 77. The further pattern may be defined by the time shifts and optionally frequency shifts between resource blocks of the further device-to-device resources 78.

The further device-to-device resource 78 in a first frame 75 is shifted relative to the device-to-device resource in the first frame 75 by a time offset 81. The further device-todevice resource 78 in a second frame 76 is shifted relative to the device-to-device resource in the second frame 76 by the same time offset 81. The further device-to-device resources 78 may be obtained by time-shifting or frequency-shifting the device-to-device resources 77.

In methods, devices and systems of embodiments, a cellular network node may compare the further device-to-device resources 78, 79 to the device-to-device resources 77. The cellular network node may determine that the pattern of the device-to-device resources 77 and the further pattern of the further device-to-device resources 78 are the same, but shifted relative to each other by a time offset. Such a situation may also be referred to as "patterned resources".

The identification of same patterns may also be extended to the case where different numbers of resource blocks are used for the cell and the further cell, respectively. For illustration, the resources 73 of the further cell include further device-to-device resources 79 which include a greater number of resource blocks than the device-to-device resources 77. The cellular network node may nevertheless identify a matching pattern, e.g. by comparing the difference between start times and lowest frequencies of the further device-to-device resources 79 in frames 75, 76 to the difference between start times and lowest frequencies of the device-to-device resources 77 in frames 75, 76.

The cellular network node may cause a message to be broadcast in the cell having the device-to-device resources 77, with the message including a type identifier which indicates that the further device-to-device resources 78, 79 and the device-to-device resources 77 have the same pattern, but are shifted by a time offset and/or frequency offset. The message may include a cell ID list of cell identifiers of the further cell(s) which are sufficiently close to the cell to be reachable by device-to-device communication and which have the further device-to-device resources 78, 79 which have the same pattern as the device-to-device resources 77, but are offset in the time direction and/or the frequency direction. The cellular network node may also include information on the time offset and/or frequency offset for transmission to the UE. The cellular network mode may also include information on the size 83 of the further device-to-device resources 79 for transmission to the UE.

In response to receiving such a broadcast message, the UE 2 may determine that the further cell(s) specified by the cell ID list have further device-to-device resources which can be computed from the broadcast device-to-device resources 77 in combination with the information on the offsets 81, 82 and, if applicable, the information on the size 83. The UE 2 may monitor the further device-to-device resources which are different from the device-to-device resources of the cell to which it is attached to discover a further UE which is under the control of one of the further cells. The monitoring can be performed without requiring that the further device-to-device resources 78, 79 are signaled to the UE. Rather, only information which allows the UE to derive the further device-to-device resources 78, 79 from the device-to-device resources by defining the relation between the two needs to be broadcast.

Because the frame timing of the cell and the further cells is aligned in the example shown in FIG. 7, it is not required that information on the relative cell timing is broadcast to the UE.

FIG. 8 shows resources 81 of a cell and resources 82, 83 of further cells which may be located within proximity range of the cell. Device-to-device resources 87 of the cell may form a pool from which resources may be allocated for device-to-device discovery and/or communication to UEs by the cell. The device-to-device resources may comprise subframes which are repeated periodically in frames 85, 86. The device-to-device resources 87 may comprise resource blocks of uplink resources which would otherwise be used for uplink communication.

Further device-to-device resources 98, 99 have a further pattern which corresponds to a pattern of the device-to-device resources 97, but shifted along the time axis. Additionally, the frame timing of the further cells is not aligned with the frame timing of the cell. Information on the time shifts 94, 95 between the frame timing may also be broadcast to the UE.

When the further device-to-device resources are not identical to, but still derivable from the device-to-device resources, a pattern index may be broadcast to the UE which defines how the further device-to-device resources are linked to the device-to-device resources. The UE may perform operations such as shifting along the time and/or frequency axis in dependence on the pattern index.

Figure 9:
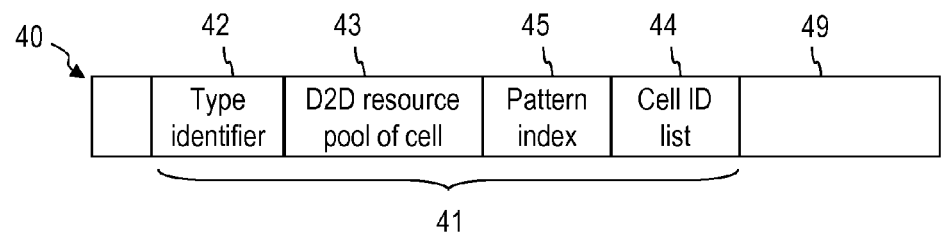
FIG. 9 shows a system information block which may be transmitted in accordance with embodiments.
Figure 10:
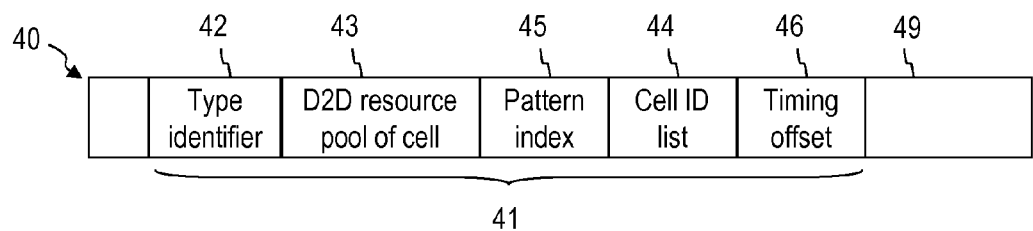
FIG. 10 shows a system information block which may be transmitted in accordance with embodiments.
Figure 11:
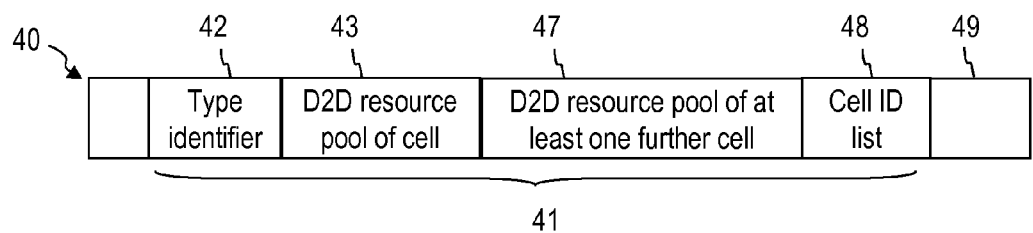
FIG. 11 shows a system information block which may be transmitted in accordance with embodiments.

FIG. 9 to FIG. 11 illustrate further examples for information which is included in a message 40 broadcast to the UE by a cellular network node. Information elements which were already described with reference to FIG. 4 may have the same configuration as explained with reference to FIG. 4.

FIG. 9 shows a message 40 which includes a pattern index 45. The pattern index 45 may be selected from a finite set of pre-defined pattern indices. The pattern index 45 may be broadcast when the type identifier 42 indicates that the further device-to-device resources have a further pattern which corresponds to the pattern of the device-to-device resources, but which may be shifted.

In response to detecting the type identifier 42, the UE may compute the further device-to-device resources from the device-to-device resources 43 for the cell in which it is located. The UE may derive the size and location of the further device-to-device resources in time and frequency domain using the pattern index 45. For illustration, the pattern index 45 may define a time shift and/or frequency shift which must be applied to the device-to-device resources 43 to derive the further device-to-device resources. The pattern index 45 may define the size of the further device-to-device resources.

FIG. 10 shows a message 40 which includes a timing offset 46. The timing offset 46 may be broadcast when the type identifier 42 indicates that the frame timing of the further cell(s) is not aligned with the frame timing of the cell. The UE may derive the size and location of the further device-to-device resources in time and frequency domain using the pattern index 45 and the timing offset.

In the messages 40 of FIG. 9 and FIG. 10, the cell ID list 44 may respectively define for which further cells the pattern index 45 and/or timing offset 46 is applicable.

FIG. 11 shows a message 40 which may be transmitted if the cellular network node does not find a relation between the further device-to-device resources and the device-to-device resources. This may be the case when the further device-to-device resources are not merely obtainable by shifting the device-to-device resources along the time and/or frequency axes in the time-frequency resource grid.

The cellular network may broadcast information 47 on the further device-to-device resources in addition to the information 43 on the device-to-device resources. The information 47 on the further device-to-device resources may be independent on the device-to-device resources. The information 47 may include one or several of: PLMNs, frequencies, cell timing, resource allocation for discovery, and/or resource allocation for communication for the respective further cells.

The type identifier 42 indicates to the UE that there is no relation between the further device-to-device resources and the device-to-device resources. The UE may determine the further device-to-device resources for discovery and/or communication from the information 47. The UE may determine the further device-to-device resources for discovery and/or communication from the information 47 and independently on the information 43 on the device-to-device resources of the serving cell.

The cellular network node may select the further cells for which the information 47 is broadcast. Criteria for selecting the further cells for which the information 47 is included in the message 40 may depend on frequencies monitored by UEs in the cell for D2D discovery and/or communication, which may be polled by the cellular network node from the UEs in the cell. Additionally or alternatively, criteria for selecting the further cells for which the information 47 is included in the message 40 may depend on the PLMNs which are of interest to the UEs. The cellular network node may poll this information from the UEs in the cell.

The message 40 may include a cell ID list 48. The cell ID list may include cell identifiers of further cells for which D2D is enabled, but for which the corresponding further device-to-device resources are not indicated in the message 40 itself. This allows the UE to request the cellular network node to transmit information on the further device-to-device resources for these further cells. Information on frequencies used for device-to-device discovery or communication in the enabled further cells may optionally also be broadcast in the cell.

In response to receiving the message 40, the UE may determine that it needs additional information on the further device-to-device resources for at least some further cells. The UE may request the cellular network node to transmit such additional information, as will be explained in more detail with reference to FIG. 13.

Figure 12:
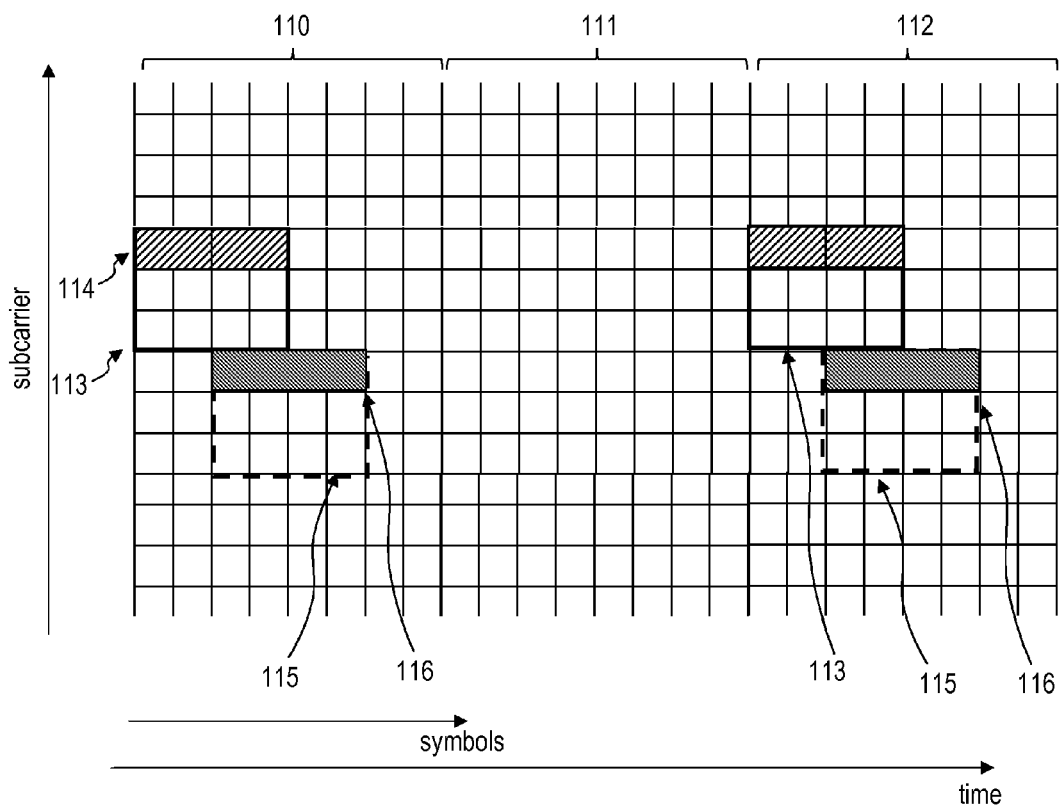
FIG. 12 shows a time-frequency resource grid illustrating a comparison of device-to-device resources and further device-to-device resources performed according to embodiments.

FIG. 12 shows a time-frequency resource grid to further illustrate the comparison performed by the cellular network node of an embodiment. The time-frequency resource grid may be spanned by a time axis and a frequency axis. The grid may be divided into subcarriers in the frequency domain and into symbols or subframes in the time domain.

Device-to-device resources 113 may be present in at least some frames 110, 112 of a plurality of frames 110, 111, 112. The device-to-device resources 113 may be present in every $n^{th}$ frame, with n being an integer greater than one. A portion 114 of the device-to-device resources 113 may be allocated to one or several UEs. The portion 114 may also vary, but is selected from the device-to-device resources 113.

Further device-to-device resources 115 may be present in at least some frames 110, 112. The further device-to-device resources 115 may be present in every $n^{th}$ frame, with n being an integer greater than one. A portion 116 of the further device-to-device resources 115 may be allocated to one or several further UEs by a further base station different from the base station serving the cell in which the device-to-device resources 113 are used. The portion 116 may also vary, but is selected from the further device-to-device resources 115.

The further device-to-device resources 115 may be shifted from the device-to-device resources 113 along the time axis. The further device-to-device resources 115 may be shifted from the device-to-device resources 113 along the frequency axis. The offsets along the time axis and/or frequency axis may be encoded in a pattern index for transmission to the UE.

Figure 13:
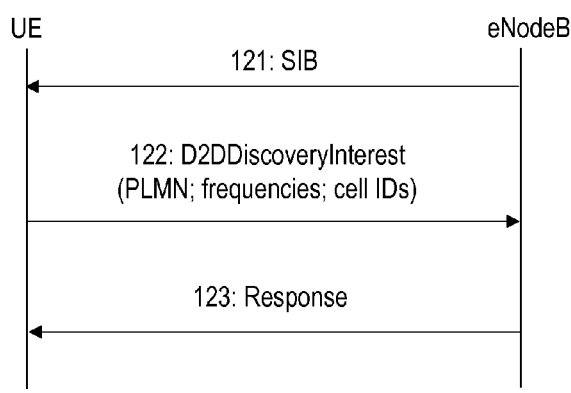
FIG. 13 is a signal flow diagram between a cellular network node and a user equipment according to an embodiment.

FIG. 13 illustrates signaling of a UE according to an embodiment. The signaling may be used when the UE requests additional information on the further device-to-device resources. The request may trigger the cellular network node to identify further cells which have the further device-to-device resources selected depending on frequencies and/or PLMNs specified by the UE.

The UE may receive a SIB 121. The SIB 121 may include a type identifier which specifies that there is no link between the device-to-device resources of the cell and the further device-to-device resources of at least one further cell. A cell identifier of the at least one further cell may be included in the SIB 121.

The UE may transmit a request 122 to request additional information on the further device-to-device resources. The request may be generated based on the cell identifier in the SIB 121. The request may define frequencies and/or at least one PLMN and/or cell IDs in which the UE is interested. The cell IDs may be selected from among the cell identifiers of D2D-enabled further cells included in the SIB 121. The frequencies may define one or several subcarriers, e.g. subcarriers which the UE monitors at any rate. The PLMN(s) may define one or several PLMNs, at least one of which is different from the PLMN to which the UE is attached.

The UE receives a response 123 which includes the requested additional information.

The eNodeB or another cellular network node may also poll the UEs for information on monitored frequencies for D2D discovery and/or communication. The eNodeB or other cellular network node may poll the UEs for information on PLMNs in which the UEs are interested for engaging in D2D discovery and/or communication. The eNodeB or other cellular network node may take this information into consideration when determining which information on the further device-to-device resources is broadcast in the SIB 121.

The response 123 may be dedicated signaling, e.g. RRC signaling. The response 123 does not need to be a broadcast message.

Figure 14:
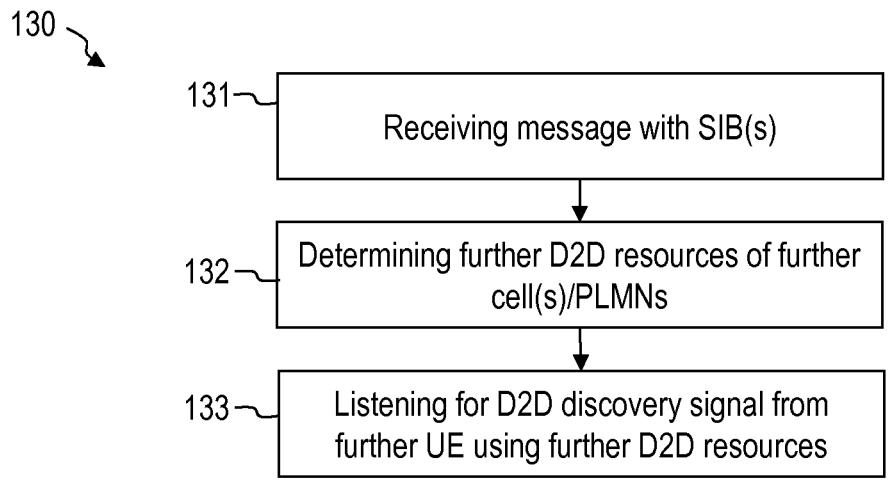
FIG. 14 is a flow chart of a method according to an embodiment.

FIG. 14 is a flow chart of a method 130 according to an embodiment. The method 130 may be performed by a user equipment according to an embodiment.

At 131, the user equipment receives one or several SIBs. The one or several SIBs may be broadcast by a base station. At least one of the SIBs includes information on the device-to-device resources of the cell in which the user equipment is located. The same SIB or another one of the SIBs may include a type identifier which defines whether further device-to-device resources for further cells within proximity range are related to the device-to-device information. A pattern index may also be included in the SIB(s) which defines how the user equipment may derive the further device-to-device resources from the device-to-device resources.

At 132, the user equipment may determine the further device-to-device resources based on the SIBs. This may be done in various ways. If the type identifier indicates that the further device-to-device resources are identical to the device-to-device resources, the user equipment knows that it can discover further UEs in the further cells by monitoring the device-to-device resources. If the type identifier indicates that the further device-to-device resources have a further pattern which corresponds to a shifted pattern of the device-to-device resources, the user equipment may apply frequency and/or time shifts to the device-to-device resources to derive the further device-to-device resources. If the type identifier indicates that the further device-to-device resources are not linked to the device-to-device resources by a transform such as a shift in the time-frequency resource grid, the user equipment may read the further device-to-device resources from the SIBs or may request the cellular network node to signal the further device-to-device resources for particular frequencies and/or PLMNs.

At 133, the UE may perform a D2D discovery and/or communication using the further device-to-device resources, e.g. to discover a further UE attached to a further cell different from the cell to which the UE is attached.

Figure 15:
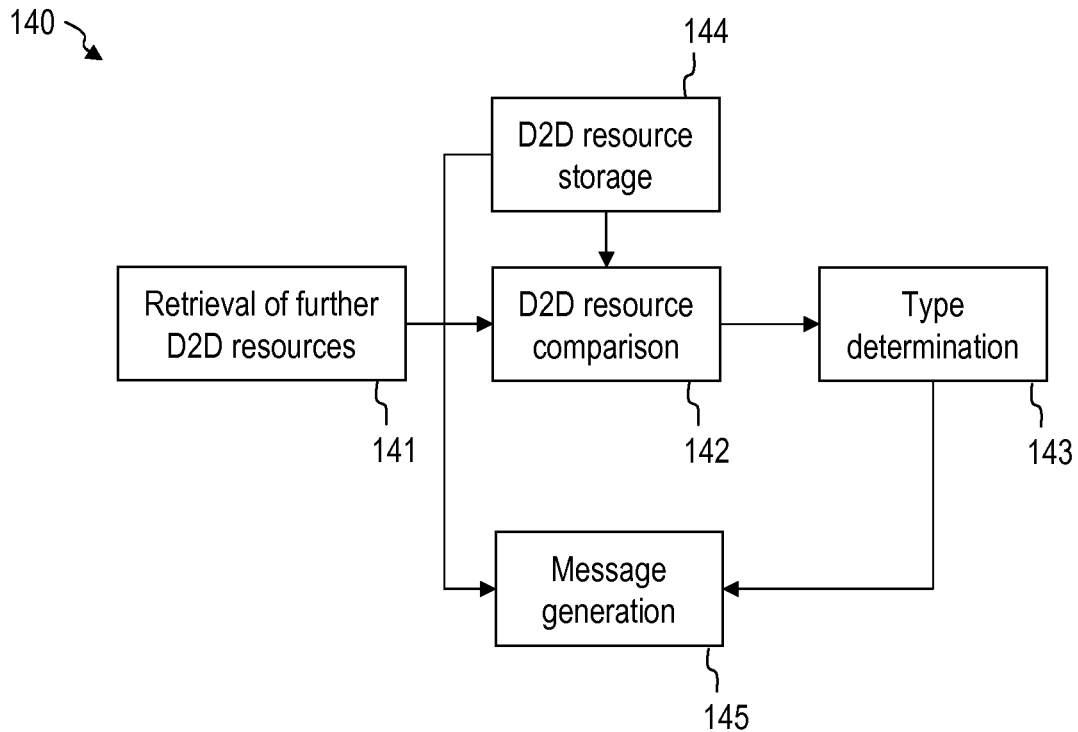
FIG. 15 is a functional block diagram of a cellular network node according to an embodiment.

FIG. 15 is a functional block diagram of a cellular network node 140 according to an embodiment. The cellular network node 140 may be an eNodeB or a node in a core network.

The cellular network node 140 comprises a retrieval module 141 for retrieving information on further device-to-device resources. The retrieval module 141 may retrieve the information from further base stations and/or over an interface between core networks of different operators.

The cellular network node 140 comprises a storage device 144 in which the device-to-device resources of the cell are stored.

The cellular network node 140 comprises a comparison module 142 which is configured to compare the device-to-device resources of the cell and the further device-to-device resources of at least one further cell. The comparison module may determine whether the device-to-device resources of the cell and the further device-to-device resources are identical. The comparison module 142 may determine whether the further device-to-device resources are derivable from the device-to-device resources by applying a transformation, e.g. by shifting in the time-frequency resource grid. The comparison module 142 may determine a time shift between frame timings of the cell and the at least one further cell.

The cellular network node 140 comprises a type determination module 143 which assigns one out of a finite set of type identifiers which define the relation between the further device-to-device resources and the device-to-device resources.

The cellular network node 140 comprises a message generation module 145. The message generation module 145 may cause the device-to-device resources of the cell, the type identifier and optionally additional information elements to be broadcast which define the relation between the further device-to-device resources and the device-to-device resources.

Figure 16:
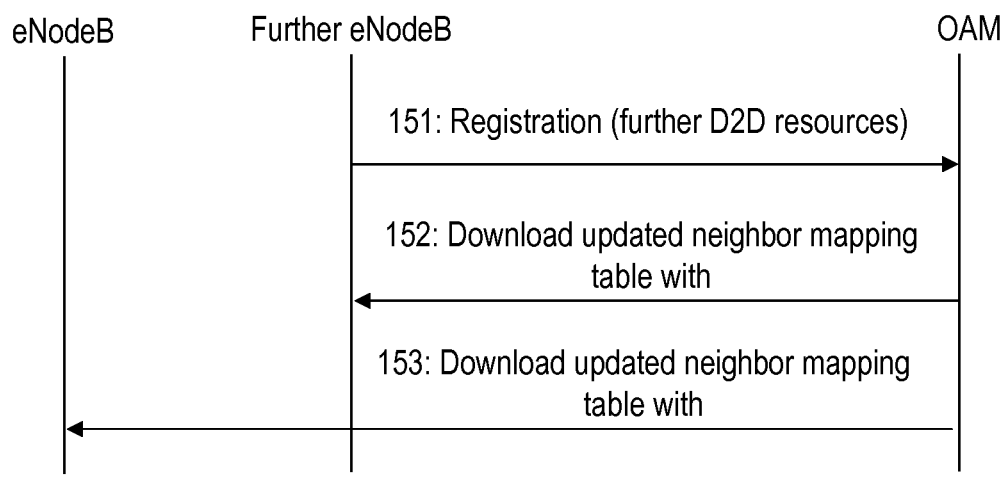
FIG. 16 is a signal flow between base stations and a core network according to an embodiment.

FIG. 16 is a signal flow diagram which illustrates one exemplary implementation of how the comparison between the device-to-device resources and the further device-to-device resources may be performed.

A registration message 151 may be transmitted by a further base station to an OAM node. The registration message 151 may include information on the further device-to-device resources in the further cell served by the further base station.

In response to the registration message 151, the OAM node may update a neighbor mapping table. The neighbor mapping table may indicate proximity relations between cells. The OAM may also determine whether the further device-to-device resources reported by the further base station are identical to or otherwise related to the device-to-device resources of the cell served by the base station. Information on whether the device-to-device resources of the cell and the further device-to-device resources reported in the registration message 151 are identical or otherwise related to each other may be stored in the neighbor mapping table. A copy of the information on the further device-to-device resources may be maintained by the OAM node.

The base station and the further base station may be provided with updated neighbor mapping table information 152, 153. The updated neighbor mapping table information 153 transmitted to the base station may include information on the further device-to-device resources reported in the registration message 151. The base station may perform the comparison between the device-to-device resources in its own cell and the further device-to-device resources, using any one of the various techniques described above. Alternatively or additionally, the OAM node may perform the comparison and may transmit the type identifier to the base station. The base station may incorporate the type identifier into a SIB, possibly after further processing.

In any one of the various embodiments, it is not always required to transmit the full information on the further device-to-device resources to inform a user equipment of the further device-to-device resources. Information element(s) which define the relation between the further device-to-device resources of adjacent cells of the same PLMN or of adjacent cells of a different PLMN may be broadcast, which the user equipment may use to derive the further device-to-device resources.

In any one of the various embodiments, the same device-to-device resources may be allocated for both D2D discovery and D2D communication. However, different resources may also be used for the D2D discovery and a subsequent D2D communication. In this case, the techniques disclosed herein may be used for providing information on the resources for the D2D discovery and/or for providing information on the resources for the D2D discovery.

In any one of the various embodiments, the D2D discovery and/or for the D2D communication performed by a UE may include the transmission and/or reception of signals which takes place over the same interface with which the UE communicates with the RAN.

Modifications or alterations may be implemented in other embodiments. For illustration, additional or alternative types of deployment scenarios may be defined.

Embodiments of the invention provide a signaling which allows a cellular communication network to inform a UE of the frequencies and/or times at which further UEs not under the control of the same cell as the UE may perform D2D discovery and/or D2D communication.

The invention claimed is:

1. A method of providing information on resources for a device-to-device discovery and/or a device-to-device communication, the method comprising: performing, in a network node, a comparison of device-to-device resources for a cell and further device-to-device resources for at least one further cell different from the cell to determine whether the device-to-device resources of the cell are offset from the further device-to-device resources of the at least one further cell along time and frequency, and generating at least one information element of a message for transmission to a user equipment based on a result of the comparison, wherein performing the comparison comprises: comparing a pattern of the device-to-device resources in a time-frequency resource grid and a further pattern of the further device-to-device resources in the time-frequency resource grid; and
   at least one of determining whether the pattern and the further pattern are identical or determining whether the further pattern is shifted in the time-frequency resource grid relative to the pattern.

2. The method of claim 1,
wherein the at least one information element comprises information on a time offset and/or a frequency offset between the pattern and the further pattern.

3. The method of claim 2,
wherein the time offset and/or the frequency offset is determined with reference to a serving cell.

4. The method of claim 1,
wherein performing the comparison comprises:
determining whether a frame timing of the cell and a frame timing of the at least one further cell are aligned.

5. The method of claim 4,
wherein the at least one information element comprises information on a time offset between the frame timing of the cell and the frame timing of the at least one further cell.

6. The method of claim 4,
wherein the at least one information element is generated such that it includes a type identifier which defines
whether the further pattern is identical to the pattern or shifted in the time-frequency resource grid relative to the pattern, and
whether the frame timing of the cell and the frame timing of the at least one further cell are aligned.

7. The method of claim 1, further comprising:
selecting, in dependence on a result of the comparison, the at least one further cell to provide the user equipment with information on the further device-to-device resources.

8. The method of claim 1,
wherein information on the further device-to-device resources is selectively included in the message only if the comparison shows that the further device-to-device resources are not derivable from the device-to-device resources.

9. The method of claim 1,
wherein the at least one information element defines an offset in a time-frequency resource grid with reference to a serving cell.

10. The method of claim 1, further comprising:
receiving, from the user equipment, a request for additional information on the further device-to-device resources in response to transmitting the message to the user equipment, and
generating a further message for transmission to the user equipment which includes the additional information.

11. The method of claim 10,
wherein the request identifies frequencies of the further device-to-device resources and/or a public land mobile network in which the user equipment is interested.

12. The method of claim 1,
wherein the message is generated to include information on the device-to-device resources for the cell, and
wherein the method further comprises:
determining, by the user equipment, the further device-to-device resources from the information on the device-to-device resources and the at least one information element included in the message.

13. The method of claim 12,
wherein determining the further device-to-device resources comprises:
determining, by the user equipment, a time offset and/or a frequency offset between the device-to-device resources and the further device-to-device resources based on the at least one information element.

14. The method of claim 1, further comprising:
performing, by the user equipment, a device-to-device discovery using resources determined based on the at least one information element to discover a further user equipment attached to a cell or public land mobile network different from the cell or public land mobile network to which the user equipment is attached.

15. A cellular network node, comprising: a processing device configured to: perform in the network node a comparison of device-to-device resources for a cell and further device-to-device resources for at least one further cell different from the cell to determine whether the device-to-device resources of the cell are offset from the further device-to-device resources of the at least one further cell along time and frequency,
wherein the processing device is configured to perform the comparison by comparing a pattern of the device-to-device resources in a time-frequency resource grid and a further pattern on the further device-to-device resources in the time-frequency resource grid; determining at least one of whether the pattern and the further pattern are identical or whether the further pattern is shifted in the time-frequency resource grid relative to the pattern, and generate at least one information element of a message for transmission to a user equipment based on a result of the comparison; and an interface configured to output the at least one information element for transmission to the user equipment.

16. The cellular network node of claim 15,
wherein the processing device is operative to determine whether a pattern of the device-to-device resources in a time-frequency resource grid and a further pattern of the further device-to-device resources in the time-frequency resource grid are identical.

17. The cellular network node of claim 15,
wherein the processing device is operative to determine whether a pattern of the device-to-device resources in a time-frequency resource grid and a further pattern of the further device-to-device resources in the time-frequency resource grid are shifted in the time-frequency resource grid.

18. The cellular network node of claim 15,
wherein the processing device is operative to generate the at least one information element such that it indicates
whether a pattern of the device-to-device resources in a time-frequency resource grid and a further pattern of the further device-to-device resources in the time-frequency resource grid are identical or shifted in the time-frequency resource grid, and
whether a frame timing of the cell and a frame timing of the at least one further cell are aligned.

19. The cellular network node of claim 15,
wherein the cellular network node is operative to selectively provide information on the further device-to-device resources for transmission to the user equipment if the further device-to-device resources are not derivable from the device-to-device resources.

20. A user equipment, comprising:
a wireless interface configured for communication with a cellular communication network; and
a processing device configured to control the wireless interface to perform a device-to-device discovery and/or a device-to-device communication with a further user equipment, the processing device being configured to process a
message received from the cellular communication
network at the wireless interface that identifies whether
device-to-device resources of a cell are offset from
further device-to-device resources of at least one further cell along time and frequency to determine which
further device-to-device resources are used by a further
user equipment for the device-to-device discovery and/
or a device-to-device communication, the further user
equipment being located in a further cell different from
the cell in which the user equipment is located
wherein the message comprises at least one information
element which indicates whether a pattern of the
device-to-device resources in a time-frequency-resource grid is identical to a pattern of the further
device-to-device resources in the time-frequency-resource grid, or at least one information element which
indicates whether a pattern of the device-to-device
resources in a time-frequency-resource grid is shifted in
the time-frequency-resource grid relative to a pattern of
the further device-to-device resources in the time-frequency-resource grid.

21. The user equipment of claim 20,
wherein the processing device is configured to detect
device-to-device discovery signals transmitted by the
further user equipment at the further device-to-device
resources based on the message received from the
cellular communication network.

22. The user equipment of claim 20,
wherein the message comprises at least one information
element which indicates
whether a pattern of the device-to-device resources in
a time-frequency resource grid and a further pattern
of the further device-to-device resources in the time-frequency resource grid are identical or shifted in the
time-frequency resource grid, and
whether a frame timing of the cell and a frame timing
of the at least one further cell are aligned.

23. The user equipment of claim 20,
wherein information on the further device-to-device
resources are included in the message if the further
device-to-device resources are not derivable from the
device-to-device resources.

\* \* \* \* \*